Dec. 7, 1948. H. S. HOFFAR 2,455,368
ANTIFRICTION SCREW AND NUT BEARING MECHANISM
Filed May 19, 1945
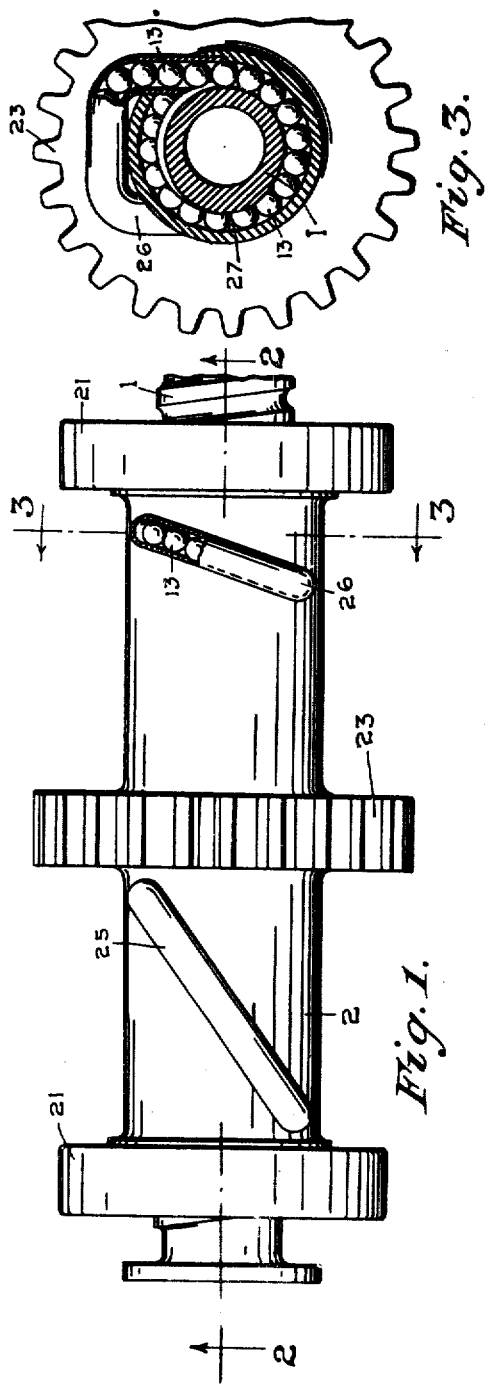
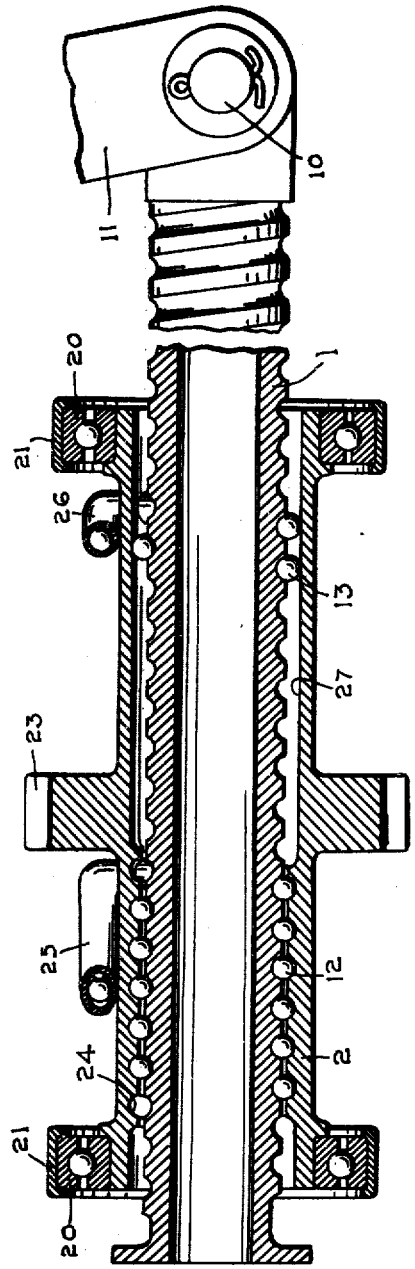
INVENTOR.
Henry S. Hoffar
BY
Reynolds & Beach
ATTORNEYS.

Patented Dec. 7, 1948

2,455,368

UNITED STATES PATENT OFFICE 2,455,368

ANTIFRICTION SCREW AND NUT BEARING MECHANISM

Henry S. Hoffar, near Sidney, British Columbia, Canada, assignor to The Cleveland Pneumatic Tool Company, Cleveland, Ohio, a corporation of Ohio Application May 19, 1945, Serial No. 594,654

9 Claims. (Cl. 74—459)

Perhaps the most general application for antifriction screw devices of the type shown in my Patent No. 2,298,011, issued October 6, 1942, is that in which the screw is rotated, such as by a bevel gear drive, or by an electric motor connected directly to the screw, while the nut is held nonrotatively in an element to be moved lengthwise of the screw.

In some installations, however, it is preferred to rotate the nut while holding it against axial movement for the purpose of moving lengthwise a screw threaded in it. In such installations it has heretofore been difficult to provide a satisfactory bearing for the nut on the screw, particularly if the screw is subjected to bending loads. My present invention is especially useful in an assembly of this type, but it may also be employed to advantage in installations where the nut does not rotate.

It is therefore the principal object of my invention to provide an antifriction screw and nut combination of the type generally disclosed in my aforesaid Patent No. 2,298,011, in which a radial bearing of much greater effective length between the screw and nut is afforded.

A further object is to obtain the advantage of a radial type bearing of any desired effective length without increasing the number of bearing balls required to transmit thrust between the screw and the nut. Moreover such structure is simple in construction and can be manufactured economically.

An additional object is to achieve the stability inherent in a long effective bearing structure without increasing appreciably the friction between the screw and nut and the balls interengaged between them, resulting in the antifriction screw construction disclosed herein having approximately as high an efficiency as that of my patent mentioned above.

A representative embodiment of my invention is shown as applied to a nut held against lengthwise movement and rotated by a spur gear drive. This nut cooperates with a screw which does not rotate, but is moved lengthwise through the nut. It will be evident, however, that the principle of my present invention is applicable whether the nut or the screw or both rotate, and regardless of which of the nut and screw is the driven member.

Figure 1 is a side elevational view of the screw and nut assembly, parts being broken away, and Figure 2 is a longitudinal sectional view through the screw and nut.

Figure 3 is a transverse sectional view through the screw and nut taken on line 3—3 of Figure 1.

The screw 1, as shown in Figure 2 of the drawing, has one end connected by a pivot 10 to a swinging arm 11, for example, which restrains rotation of the screw. As the screw is moved lengthwise by the thrust force exerted on it by rotation of nut 2, however, it will swing arm 11. Opposite ends of the nut are supported for rotation relative to the structure in which the nut is installed by antifriction bearings 20, disposed one at each end of the nut sleeve. The outer section 21 of the bearing may be supported stationarily.

Intermediate the two ends of the nut sleeve 2 a drive chain sprocket or a spur drive gear 23 may be secured upon or formed integral with the nut sleeve. While this arrangement is a convenient and preferred form of nut sleeve drive, such sleeve may be rotated by mechanism of other types, as mentioned previously.

The external thread on screw 1, preferably of circular arcuate conformation in cross section, is complemental to the internal thread 24 formed within the nut sleeve 2. In these complemental nut and screw grooves balls 12 are received, which should be of alternately small and large size to obtain the best efficiency, in conformity with the disclosure of my Patent No. 2,298,011 cited above. These balls recirculate through a by-pass passage in the nut sleeve, which in this instance takes the form of a tube 25 of generally U shape, the opposite ends of which open into opposite ends of the nut groove 24.

The length of the internally grooved portion of the nut sleeve 2 will be sufficient so that the balls 12 interengaged between the screw 1 and such grooved portion of the nut sleeve transmit the entire lengthwise thrust force between these elements with an adequate safety factor. In most applications of the screw and nut it will be found that a single circuit of balls filling from three to five complete turns of the complemental grooves will be adequate to carry the thrust load between the screw and nut sleeve.

The several turns of balls interengaged between the screw and nut will, of course, function as a radial bearing, as well as carrying the load lengthwise of the nut and screw, but the extent lengthwise of the screw of a helical ball circuit including not more than five turns will not be very great. Consequently the effectiveness of these interengaged balls 12 to transmit bending loads between screw 1 and the nut sleeve 2 is insubstantial.

It would be possible, of course, to provide a radial bearing of sufficient length between the nut and screw, without altering the pitch of their threads, by increasing the length of the threaded nut section 24 to a substantial degree. Thus, instead of three or five turns of interengaged balls, ten or fifteen such turns could be employed. Despite the effectiveness of the use of alternate large and small balls to reduce friction, as disclosed in my aforesaid patent, an appreciably greater friction would be created by such increase in the number of balls and length of the ball circuit, thus reducing somewhat the efficiency of the drive. Moreover, the number of parts and the weight of the structure would be increased.

In order to obtain all the radial bearing advantages of a large number of turns of balls interengaged between the screw and the nut sleeve, I provide a second circuit of balls 13, additional to the circuit of thrust balls 12, circulating between the screw 1 and nut sleeve 2, which is spaced a substantial distance lengthwise of such sleeve from the thrust ball circuit. This latter circuit of balls serves purely as a radial bearing, all the forces lengthwise of the screw being transmitted through the balls 12 interengaged between the screw and the threaded portion 24 of the nut sleeve. Adequate radial bearing effect at the location of such second ball circuit is afforded by a single complete turn of balls 13, even though alternate smaller balls are interposed between the load-carrying balls, just as in the thrust-transmitting circuit of balls 12. Consequently, a relatively short bypass tube 26 will afford recirculation of balls 13 in the radial bearing circuit.

It might be suggested that the thrust-transmitting circuit of balls 12 could be divided into two sections spaced apart a substantial distance to afford a bearing of considerable effective length, and such an arrangement is possible. It is considered to be less desirable than the instant construction, however, because there is a possibility that the two threaded portions of the nut will not be in exactly the same relationship to the thread of the screw 1, which would result in an unequal distribution of the thrust load. The balls in one circuit, therefore, might be overloaded, whereas the balls in the other circuit would be correspondingly lightly loaded. If each circuit were made sufficiently long so that it alone could carry the thrust load, the structure would again be more complicated and heavier than necessary.

It is preferred, therefore, that the circuit of balls 12 be designed to carry all the load lengthwise of the screw and nut, while at the same time carrying a portion of the radial load. That the radial bearing circuit of balls 13 will transmit no thrust between the screw and nut sleeve is assured by receiving such balls in a tubular portion 27 of the nut sleeve having an internal diameter equal to the root diameter of the threaded nut sleeve portion 24.

The balls 13 cannot escape from the screw groove because of the confining action of the nut sleeve wall, and such wall will carry the radial loads transmitted by these balls. Because this portion of the nut sleeve is unthreaded, however, no abutments are available for receiving from the balls forces acting lengthwise of screw 1. Thus while the circuit of such balls constitutes an effective antifriction bearing for radial loads between the screw and nut, such balls cannot be loaded axially of the screw.

The spacing between the combined thrust and radial bearing circuit of balls 12 and the exclusively radial bearing circuit of balls 13 will determine the effective over-all length of the radial bearing between the screw and nut sleeve. However great this distance may be, the radial bearing circuit of balls 13 will be of minimum actual length, so that the friction created by both ball circuits between the screw and the nut sleeve will not be appreciably greater than that of the single circuit of thrust-carrying balls alone. While only a single additional radial bearing circuit of balls 13 has been illustrated it will be appreciated that if a radial bearing of very great effective length were desired, the thrust bearing ball circuit could be located intermediate two radial bearing ball circuits of the type described above incorporating balls 13, so that the space between the ball circuits would not be sufficiently great to invite bending of the screw between them.

I claim as my invention:

1. Antifriction screw mechanism comprising a screw having a helical groove in its periphery, a nut encircling said screw and having a helical groove in its inner periphery over a portion only of its length and an ungrooved section spaced a substantial distance lengthwise thereof from such groove, a plurality of turns of balls engaged in the helical groove of said nut and the adjacent helical groove of said screw, thus interconnecting said screw and said nut, a substantial number of balls in said set being operable simultaneously to transmit between said screw and nut both forces acting radially thereof and forces acting lengthwise thereof, by-pass means carried by said nut and communicating with portions of said nut's helical groove spaced lengthwise of the nut for recirculation of said balls therethrough, additional balls received in a portion of said screw groove adjacent to such ungrooved portion of said nut, adapted to bear radially against such ungrooved portion of said nut, at any given time a substantial number of said additional balls being operable to transmit between said screw and nut forces acting radially thereof but substantially all of said additional balls at any given time being inoperative to transmit between such members forces acting lengthwise thereof, and additional by-pass means carried by said nut and communicating with portions of said nut's ungrooved section spaced lengthwise of the nut for recirculation of said additional balls therethrough.

2. Antifriction screw mechanism comprising a screw having a helical groove in its periphery, a nut encircling said screw and having a helical groove in its inner periphery over a portion only of its length and an ungrooved section spaced a substantial distance lengthwise thereof from such groove, a plurality of turns of alternate large and small balls engaged in the helical groove of said nut and the adjacent helical groove of said screw, thus interconnecting said screw and said nut, substantially all of said large balls of said set thus engaged in said grooves being operable simultaneously to transmit between said screw and nut both forces acting radially thereof and forces acting lengthwise thereof, by-pass means carried by said nut and communicating with portions of said nut's helical groove spaced lengthwise of the nut for recirculation of said balls therethrough, additional alternate large and small balls received in a portion of said screw groove adjacent to such ungrooved portion of said nut, adapted to bear radially against such ungrooved portion of said nut, at any given time substantially all of said additional large balls in said screw groove being operable to transmit between said screw and nut forces acting radially thereof but substantially all of said additional balls at any given time being inoperative to transmit between such members forces acting lengthwise thereof, and additional by-pass means carried by said nut and communicating with portions of said nut's ungrooved section spaced lengthwise of the nut for recirculation of said additional balls therethrough.

3. Drive mechanism comprising a sleeve, two bearing means rotatively supporting opposite ends of said sleeve and restraining lengthwise movement thereof, a circular drive member carried by and rotative with said sleeve and located generally centrally between said two bearing means, a nonrotative shaft movable lengthwise, of substantially greater length than the length of said sleeve, and extending therethrough, means engaged between said sleeve and said shaft, located intermediate said circular drive member and the said bearing means at one end of said sleeve, and operable to transmit between said sleeve and said shaft both forces acting radially thereof and forces acting lengthwise thereof, and additional means engaged between said sleeve and said shaft, located intermediate said circular drive member and the said bearing means at the other end of said sleeve, and operable to transmit between said sleeve and said shaft forces acting radially thereof but inoperative to transmit between said sleeve and said shaft forces of substantial magnitude acting lengthwise thereof.

4. Antifriction screw and nut mechanism comprising a nut, two bearing means rotatively supporting opposite ends of said nut and restraining lengthwise movement thereof, a circular drive member carried by and rotative with said nut and located generally centrally between said two bearing means, said nut having a helical groove intermediate said circular drive member and the said bearing means at one end of said nut, and having an ungrooved inner surface section between said circular drive member and the said bearing means at the other end of said nut, a nonrotative screw movable lengthwise, of substantially greater length than the length of said nut, extending therethrough, and having a helical groove in its periphery, a set of antifriction balls engaged in the groove of said nut and in the adjacent section of said screw's groove, and a second set of balls at all times disposed wholly beyond the nearer end of said nut's helical groove and engaged between such ungrooved section of said nut and the adjacent section of said screw's groove.

5. Antifriction screw and nut mechanism comprising a nut, two bearing means rotatively supporting opposite ends of said nut and restraining lengthwise movement thereof, a gear carried by and rotative with said nut and located generally centrally between said two bearing means, said nut having a helical groove intermediate said gear and the said bearing means at one end of said nut, and having an ungrooved inner surface section between said gear and the said bearing means at the other end of said nut, a nonrotative screw movable lengthwise, of substantially greater length than the length of said nut, extending therethrough, and having a helical groove in its periphery, a set of antifriction balls including alternate large and small balls engaged in the groove of said nut and in the adjacent section of said screw's groove, a by-pass tube carried by said nut overlying its helical groove and interconnecting axially spaced portions thereof for recirculation of said balls at all times disposed wholly beyond the nearer end of said nut's helical groove, and a second set of balls engaged between such ungrooved section of said nut and the adjacent section of said screw's groove, including alternate large and small balls, and an additional by-pass tube carried by said nut overlying such ungrooved section and interconnecting axially spaced portions thereof, for recirculation of the balls of said second set.

6. Antifriction screw and nut mechanism comprising a screw member having a helically grooved external surface section, a nut member encircling said screw member and having a helically grooved internal surface section, one of said members being rotative, held against axial movement and having an ungrooved surface section spaced lengthwise thereof from its grooved section, the other of said members being nonrotative and movable axially, drive means operable to rotate said one member, a set of balls engaged in the grooves of said grooved sections of said screw member and said nut member, a substantial number of balls in said set being operable simultaneously to transmit between said screw and nut members both forces acting radially thereof and forces acting lengthwise thereof, and a second set of balls engaged in the grooves of said grooved section of said other member and engageable with said ungrooved section of said one member, at any given time a substantial number of balls of said second set being operable to transmit between said screw and nut members forces acting radially thereof, but substantially all the balls in said second set at any given time being inoperative to transmit between such members forces acting lengthwise thereof.

7. Antifriction screw and nut mechanism comprising a screw member having a helically grooved external surface section, a nut member encircling said screw member and having a helically grooved internal surface section, one of said members having an ungrooved surface section spaced lengthwise thereof from its grooved section, a set of balls engaged in the grooves of said grooved sections of said screw member and said nut member, a substantial number of balls in said set being operable simultaneously to transmit between said screw and nut members both forces acting radially thereof and forces acting lengthwise thereof, a second set of balls engageable with said ungrooved section of said one member and engaged in the grooves of said grooved section of the other of said members, at any given time a substantial number of balls of said second set being operable to transmit between said screw and nut members forces acting radially thereof, but substantially all the balls in said second set at any given time being inoperative to transmit between such members forces acting lengthwise thereof, and bypass means carried by said one member having said ungrooved surface section and communicating between portions of said ungrooved surface section spaced lengthwise of such member for recirculation therethrough of the balls in said second set.

8. Antifriction screw and nut mechanism comprising a nonrotative screw having a helically grooved external surface section, a nut encircling said screw, drive means carried by said nut and operable to rotate the same, said nut having a helically grooved internal surface section and an ungrooved internal surface section in relationship spaced lengthwise of said nut, a set of balls engaged in the grooves of said grooved sections of said screw and said nut, a substantial number of balls in said set being operable simultaneously to transmit between said screw and nut both forces acting radially thereof and forces acting lengthwise thereof, and a second set of balls engaged in the grooves of said grooved section of said screw and engageable with said ungrooved section of said nut, at any given time a substantial number of balls of said second set being operable to transmit between said screw and nut forces acting radially thereof, but substantially all the balls in said second set at any given time being inoperative to transmit between such members forces acting lengthwise thereof.

9. Antifriction screw and nut mechanism comprising a nonrotative screw having a helically grooved external surface section, a nut encircling said screw, drive means carried by said nut intermediate its ends and operable to rotate the same, said nut having a helically grooved internal surface section located at one side of said drive means and an ungrooved internal surface section located at the opposite side of said drive means in relationship spaced lengthwise of said nut, a set of balls engaged in the grooves of said grooved sections of said screw and said nut, a substantial number of balls in said set being operable simultaneously to transmit between said screw and nut both forces acting radially thereof and forces acting lengthwise thereof, and a second set of balls engaged in the grooves of said grooved section of said screw and engageable with said ungrooved section of said nut, at any given time a substantial number of balls of said second set being operable to transmit between said screw and nut forces acting radially thereof, but substantially all the balls in said second set at any given time being inoperative to transmit between such members forces acting lengthwise thereof.

HENRY S. HOFFAR.

REFERENCES CITED

The following references are of record in the file of this patent:

UNITED STATES PATENTS

| Number | Name | Date |
|---|---|---|
| 1,885,970 | Westling | Nov. 1, 1932 |
| 2,298,011 | Hoffar | Oct. 6, 1942 |